J. DONALD & T. F. DOWNEY.
FURNACE.
APPLICATION FILED AUG. 5, 1916.
1,301,111.
Patented Apr. 22, 1919.
5 SHEETS—SHEET 1.
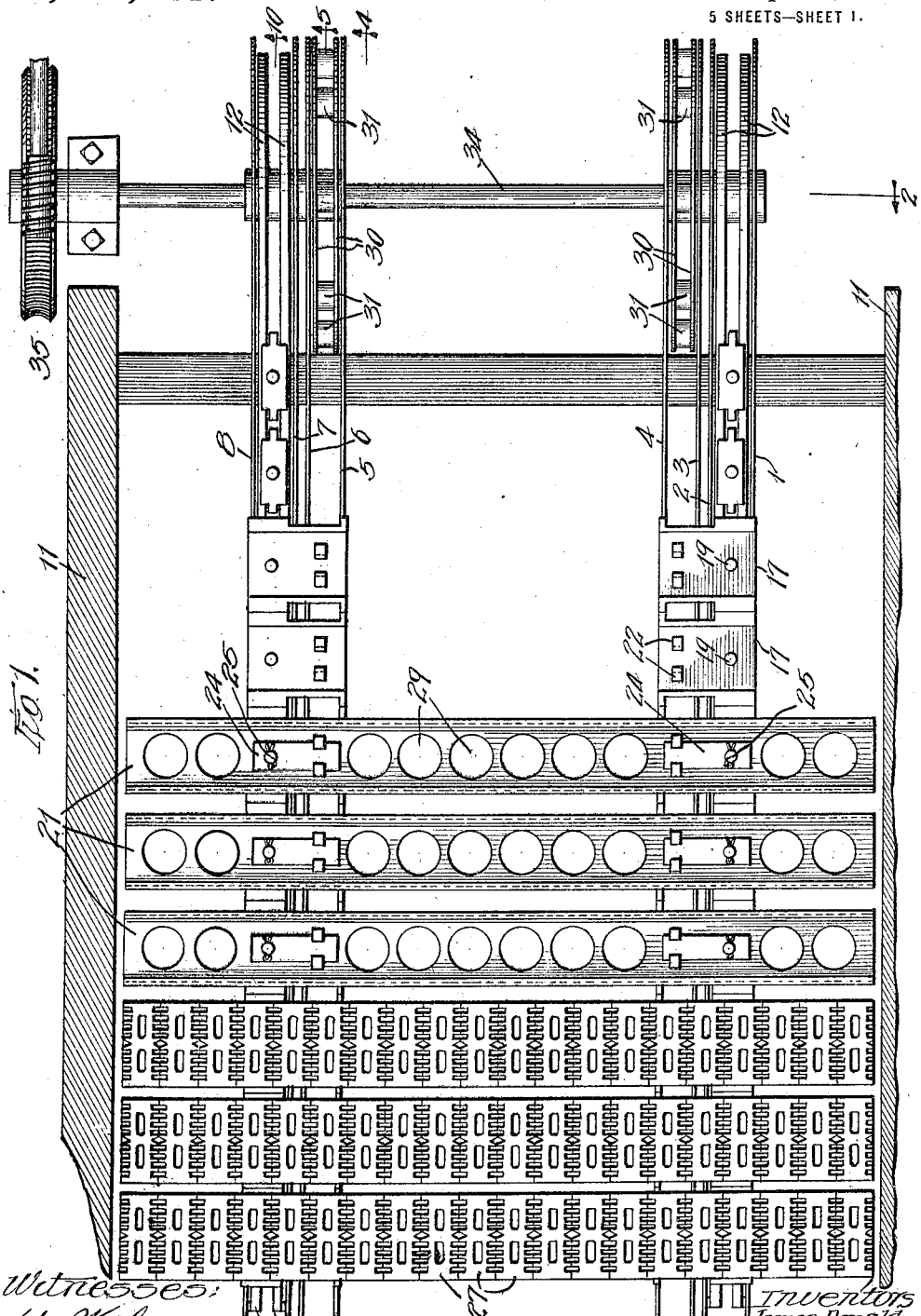
Witnesses:
W. P. Kilroy
Harry W. L. White
Inventors
James Donald
Thomas F. Downey
By Miller Chindahl Parker
Attys

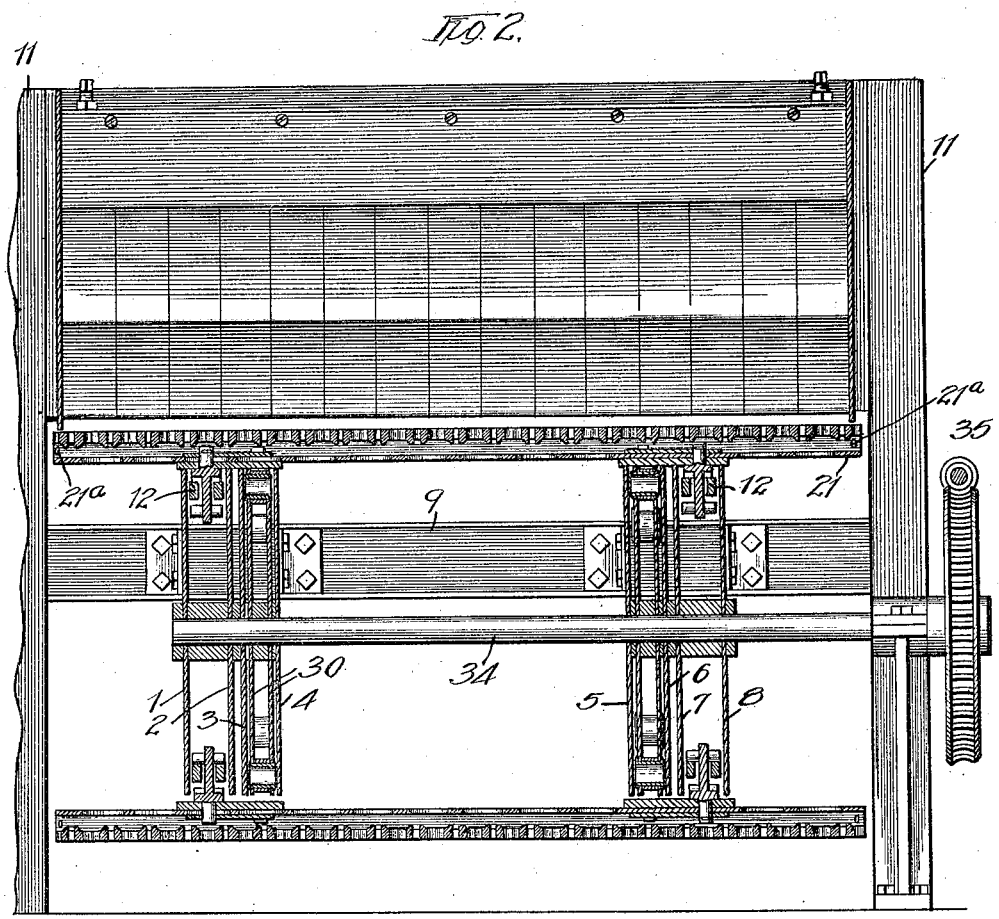
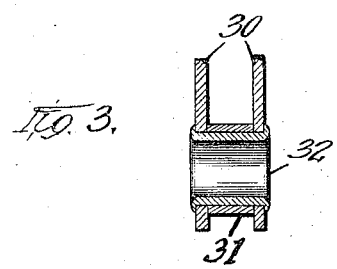

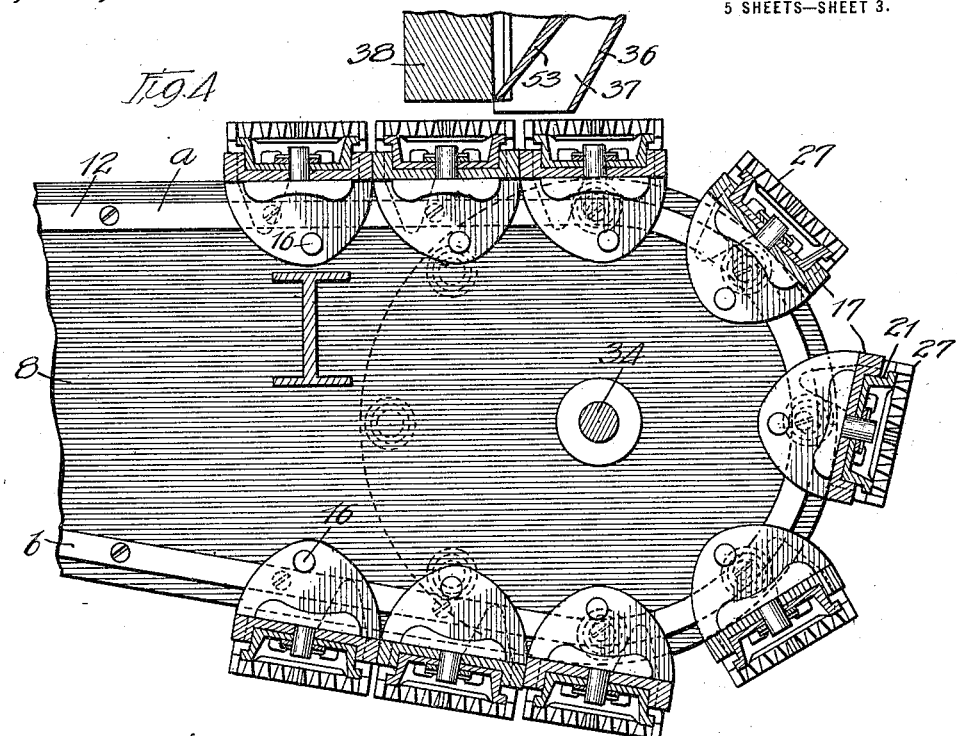
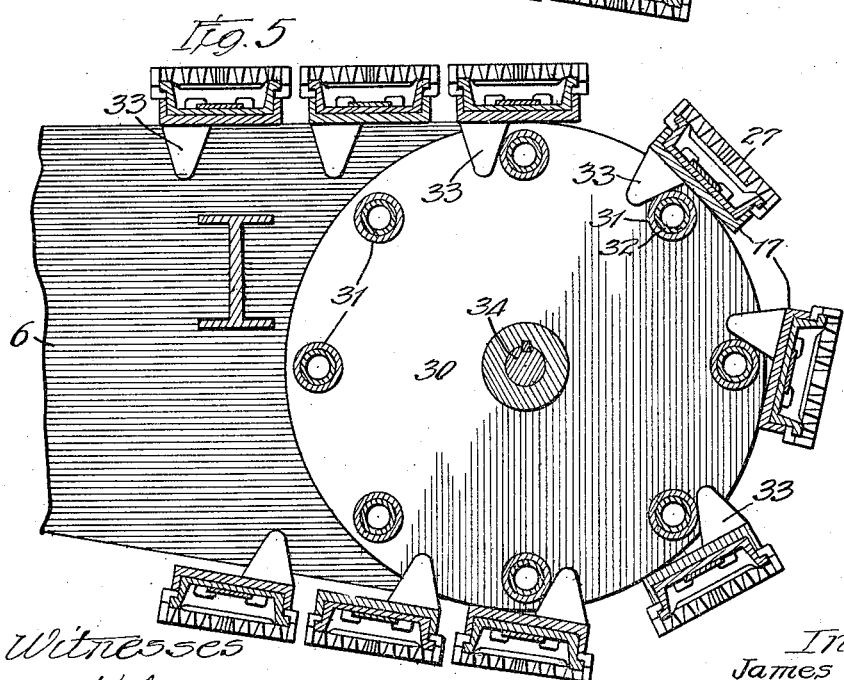

J. DONALD & T. F. DOWNEY.
FURNACE.
APPLICATION FILED AUG. 5, 1916.
1,301,111.
Patented Apr. 22, 1919.
5 SHEETS—SHEET 4.
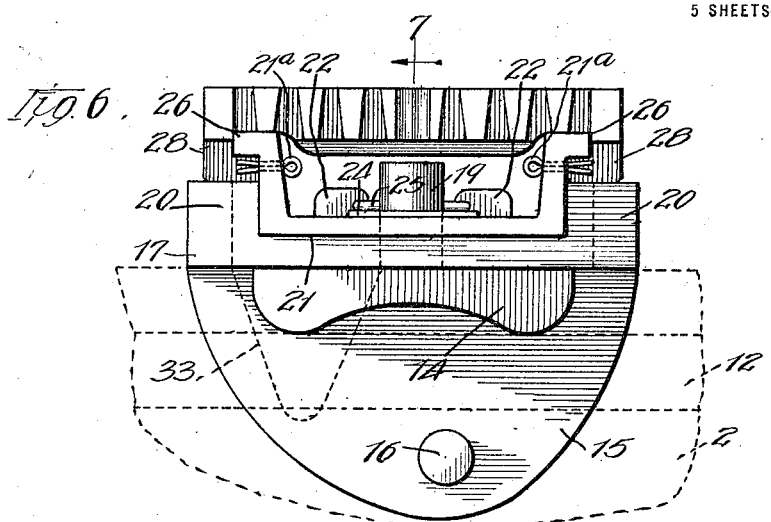
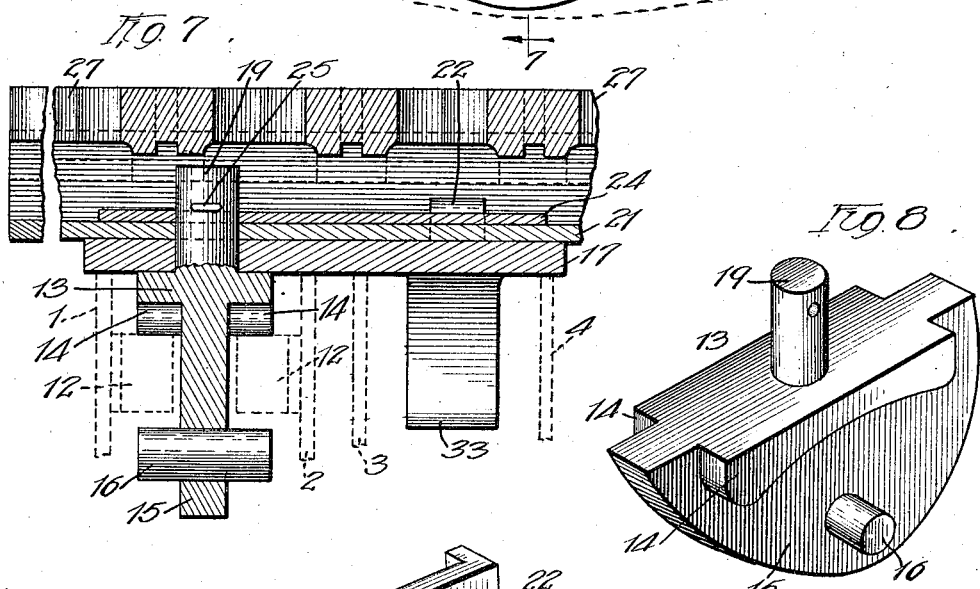
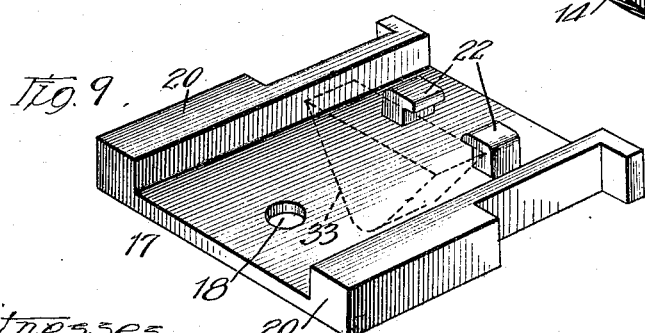
Witnesses
W. F. Kilroy
Harry R. L. White
Inventors
James Donald
Thomas F. Downey
By Miller Chindahl Parker
Attys

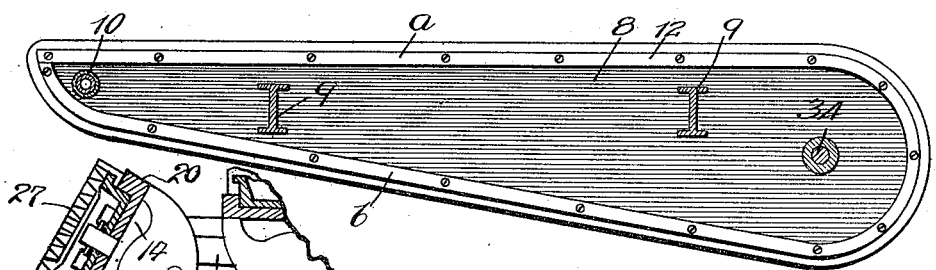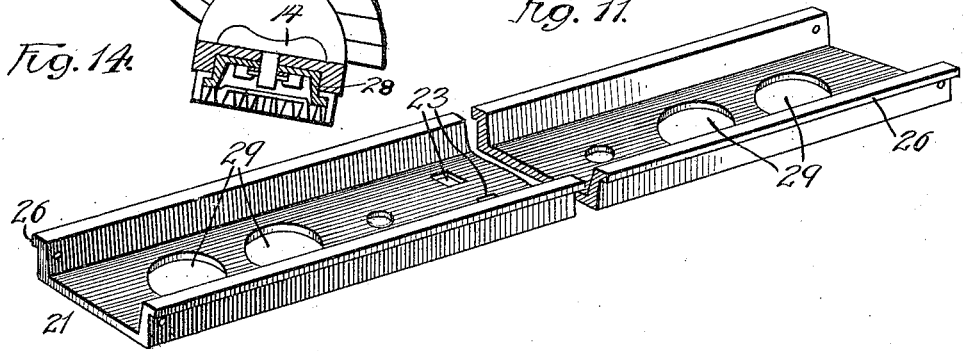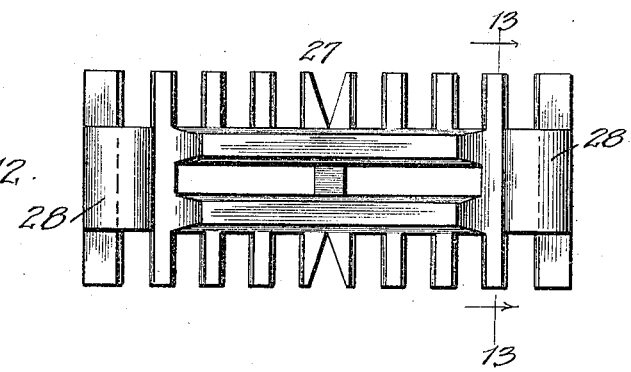

UNITED STATES PATENT OFFICE.

JAMES DONALD AND THOMAS F. DOWNEY, OF CHICAGO, ILLINOIS.

FURNACE.

1,301,111.      Specification of Letters Patent.      Patented Apr. 22, 1919.

Application filed August 5, 1916. Serial No. 113,245.

*To all whom it may concern:*

Be it known that we, JAMES DONALD and THOMAS F. DOWNEY, citizens of the United States, residing at Chicago, in the county of Cook and State of Illinois, have invented certain new and useful Improvements in Furnaces, of which the following is a specification.

This invention relates to furnaces for burning fuel or for heating, calcining or smelting ores and other material.

Among the objects of the invention are to provide an improved construction of grate bars; to provide a traveling grate of such character that the grate bars, after having performed their carrying function, shall be quickly withdrawn from the region of intense heat and of such nature that the grate bars upon starting to return to the front of the furnace shall tilt so as to throw the material rearwardly; and to provide a traveling grate having simple and efficient means for causing the grate bars to travel.

In the accompanying drawings, Figure 1 is a fragmental plan view of a grate embodying the features of our invention. Fig. 2 is a vertical sectional view taken in the plane of dotted line 2 of Fig. 1. Fig. 3 is a fragmental detail view of one of the sprocket wheels. Fig. 4 is a fragmental vertical sectional view taken in the plane of dotted line 4 of Fig. 1. Fig. 5 is a fragmental vertical sectional view on dotted line 5 of Fig. 1. Fig. 6 is a view of one end of one of the grate bars. Fig. 7 is a section on dotted line 7—7 of Fig. 6. Fig. 8 is a perspective view of one of the elements of the grate bar. Fig. 9 is a perspective view of another element of the grate bar. Fig. 10 is a section on dotted line 10 of Fig. 1. Fig. 11 is a fragmental perspective view of a channel bar comprised in each grate bar. Fig. 12 is a lower side view of one of the grids comprised in the grate bar. Fig. 13 is a section on dotted line 13—13 of Fig. 12. Fig. 14 is a fragmental vertical sectional view taken in the plane of line 4 of Fig. 1, and showing the relationship of the grate bars while moving relative to the rear end of their supporting frame.

The furnace herein disclosed, when used for burning fuel, may be located beneath or in front of a boiler. When used for smelting or calcining stone, ore or other material, the furnace may be located in any suitable relation to the remainder of the apparatus.

The embodiment herein shown of the invention comprises a supporting structure consisting of vertical plates 1, 2, 3, 4, 5, 6, 7 and 8 rigidly secured in parallel relation, beams 9, a brace 10 (Fig. 10) and suitable walls 11. In the present embodiment, said plates conform in outline to the shape of the path of movement of the grate bars, the latter being supported on the edges of the plates and upon rails 12 secured to the plates 1, 2, 7 and 8. As shown in Fig. 10, the rails 12 are endless, each comprising a horizontal upper portion $a$ and a lower portion $b$ inclined downwardly from rear to front, the rear section of the lower portion of the endless rail providing a sharp turn.

The grate bars are structurally independent of each other. In the left-hand portion of Fig. 1 are shown three complete grate bars. Each bar comprises two members 13 (Fig. 8), each member 13 having two bearing flanges 14 adapted to slide upon the rails 12. The member 13 also comprises a lug 15 in which a suspending pin 16 is set. The flanges 14 and pins 16 are located at opposite sides of the rails 12, there being sufficient space between the flanges and the pin, so that when the grate bar slides down the inclined lower portion $b$ of the rails the flanges are out of contact with the rails, the bar being suspended by the pins 16 of the two members 13 comprised in the grate bar. (See Fig. 4.)

Each grate bar further comprises two plates 17 (Fig. 9) adapted to rest upon the upper edges of the plates 1 to 8, inclusive, and upon the members 13. 18 is an opening in the plate 17 through which a stud 19 on the member 13 extends. The plates 17 have side flanges 20 between which lies a channel bar 21 (Fig. 11). 22 are hooks on the plates 17, said hooks extending through openings 23 (Fig. 11) in the channel bar. The member 13, the plate 17 and the channel bar 21 are secured together by means of a plate 24 overlying the channel bar and extending beneath the hooks 22, said plate 24 having an opening through which the stud 19 projects. 25 is a cotter pin extending through the stud 19.

The flanges of the channel bar 21 have outwardly extending ribs 26. On the channel bar is placed a series of oblong grids 27 (Figs. 1 and 12) each having hooks 28 that engage beneath the ribs 26. The series of grids is held against endwise movement on the channel bar 21 by means of cotter pins 21ª (Figs. 2 and 6).

The bar 21 may have holes 29 therein to allow air to pass up through the bar and the grids.

It will be seen that the grate bars may be readily taken apart whenever it is necessary to replace a damaged element.

The grate bars are caused to travel by means of two sprocket wheels each formed of two disks 30 spaced apart by sleeves 31 (Fig. 3) and secured together by tubular rivets 32, extending through said sleeves. The sleeves 31 virtually constitute sprocket teeth and are arranged to engage driving lugs 33 on the plates 17. The wheels are mounted on a shaft 34 which may be driven in any suitable way, as, for example, by means of a worm drive as shown at 35 (Fig. 1).

As the sprocket wheels raise the grate bars onto the horizontal portions a of the rails 12, each grate bar pushes before it the grate bars standing on said horizontal portions. In practice the series of grate bars completely fills the portions a of the rails and in addition there are a few grate bars at the lower end of the inclined portion b. As the sprocket wheels add a grate bar to the forward end of the series, the rearmost bar is pushed off the portion a of the rails and immediately slides down the inclined portions b of the rails, such rearmost bar being thus quickly removed from the region of intense heat as soon as its function of carrying fuel or the like has been performed. The grate bars slide within reach of the sprocket wheels and are again elevated into operative position.

As shown in Fig. 4, the pins 16 are offset toward the rear end of the members 13, in order that when said members are suspended on the inclined portions b the forward ends of said members shall swing down and thus keep the bearing portions 14 and the plates 17 out of contact with the rails 12 and the plates 1 to 8, respectively.

When the grate bars are pushed off the rear end of the horizontal portions a of the rails 12, the grate bars make an abrupt change of direction when they encounter the sharp turn of the rails, thereby throwing rearwardly the material carried upon the bars and removing the material from the vicinity of the grate.

Any suitable means may be employed to place upon the grate the material to be burned, heated or calcined. Herein is shown means for feeding mine run coal or similar fuel. In Fig. 4, 36 denotes the inclined front wall of a coal hopper, and 37 one of the end walls of the hopper, said front and end walls being stationary. The rear wall of the hopper is vertically adjustable to enlarge or diminish the outlet of the hopper. Behind the rear wall of the hopper is a series of tiles 38 of fire-resistant material.

We would have it understood that the invention is not limited to the construction and arrangement herein shown, as various modifications may be resorted to within the scope of the appended claims.

We claim as our invention:

1. A grate comprising an endless support consisting of an upper portion and a lower portion, a series of grate bars, a bearing member on each bar for slidably supporting the bar upon said upper portion, a member on each bar for slidably suspending said bar upon the lower portion of the support, said members being at opposite sides of said support, and means for moving the grate bars.

2. A grate bar comprising a bar, a plate having a driving lug, and a member having a bearing device and a suspending device, said parts being detachably secured together.

3. A grate bar comprising a bar, a plate having a driving lug, and a member having a bearing surface, a suspending device, and a stud extending through openings in said bar and plate, and means engaging said stud to detachably secure the parts together.

4. A grate bar comprising a bar, a plate underlying the bar and having a driving lug, a member underlying the plate and having a bearing surface, a suspending device and a stud extending through openings in said bar and plate, a hook on the plate extending through a hole in the bar, a plate overlying the bar and engaged by said hook, said stud extending through the last mentioned plate, and a securing device engaging the stud above the last mentioned plate.

5. A grate comprising an endless support consisting of an upper portion and a lower portion having a section providing a sharp and abrupt turn between said upper and lower portions, a series of grate bars each structurally independent of the other and slidable on said endless support, and means for moving the grate bars whereby each of said bars when passing said turn will move freely of the others and throw rearwardly the material carried thereby.

6. A grate bar having a supporting device and a suspending device at each end, and a driving lug near each of said devices.

7. A grate comprising an endless support consisting of an upper portion and an inclined lower portion, a series of grate bars, a bearing member on each bar slidable on said upper portion, a member on each bar for slidably suspending the bar upon the inclined portion of the support, said members being at opposite sides of said support, and means for moving the grate bars from the lower to the upper portion of the support.

8. A grate comprising an endless support consisting of an approximately horizontal upper portion and an inclined lower portion having a rear section providing a sharp and abrupt turn between said portions, a series of structurally independent grate bars slidably supported upon said endless support, and means at the forward end of the support for moving said grate bars from the lower end of the lower portion to the opposite end of the upper portion whereby said bars when passing said turn will throw rearwardly the material carried upon said bars.

9. A grate comprising an endless support consisting of an upper portion and an inclined lower portion, a series of grate bars, a bearing member on each bar slidable on the upper portion of said support, said grate bars being structurally independent of each other and each having a member for slidably suspending the bar upon the inclined portion of the support, said members being at opposite sides of said support, and means at the lower end of said inclined portion for moving the grate bars from the lower to the upper portion of the support.

10. A grate comprising an endless support consisting of an upper portion and an inclined lower portion, a series of grate bars slidable on said upper portion, said grate bars being structurally independent of each other, each grate bar having a suspending pin arranged to slide upon said inclined portion, said pin being offset toward the rear portion of the grate bar, so as to cause the forward end of the bar to be suspended out of contact with the inclined lower portion of the endless support.

In testimony whereof we have hereunto set our hands.

JAMES DONALD.
THOMAS F. DOWNEY.

Copies of this patent may be obtained for five cents each, by addressing the "Commissioner of Patents, Washington, D. C."